July 22, 1969  D. R. ARNOLD  3,456,687
VALVE ASSEMBLY FOR L.P. GAS TANKS
Filed March 21, 1967

INVENTOR.
DELEVAN R. ARNOLD
BY Roy A. Plant
ATTORNEY

United States Patent Office 3,456,687
Patented July 22, 1969

3,456,687
VALVE ASSEMBLY FOR L.P. GAS TANKS
Delevan R. Arnold, Kalamazoo, Mich., assignor to The Arnold Tackle Corporation, Paw Paw, Mich., a corporation of Michigan
Filed Mar. 21, 1967, Ser. No. 624,935
Int. Cl. F16k *15/18, 15/14;* B05b *7/24*
U.S. Cl. 137—604                                                   11 Claims

ABSTRACT OF THE DISCLOSURE

This is a valve assembly for mounting on the outlet of a tank of "L.P." liquefied gas so as to substantially prevent gas leakage through said connection, while substantially eliminating the passage of liquefied gas as such through the valve, and at the same time facilitating close control of the gas flow.

BACKGROUND OF THE INVENTION

The present invention relates broadly to valve assemblies, and more specifically to a special valve adapted for use on liquefied gas tanks sold for individual use on small torches, gaslights, toasters, stoves, portable campers' heaters, and the like.

Small tanks of liquefied gas (such as butane, propane, and the like) with a sealing cap replaceable by a control valve on the top of same are on the open market and in common use. Difficulty is commonly had with the valves used on these tanks, especially if they are used in inverted position or even laid on their side since the liquefied gas passes direct to the valve in liquid form rather than as a gas. Under these conditions the common thing is for droplets of liquid gas to reach the outlet orifice of the valve without completely vaporizing which interferes with satisfactory uniform gas flow under pressure from the valve to the point of use. As a result the proper aspiration of air into the flowing gas on its way to the point of use does not take place to produce the proper gas-air mixture for burning, and as a result the burning, for instance in a light, is nonuniform with sputtering of the burning flame which sometimes even goes out. Another difficulty is that the interior of the valve now commonly used is so constructed that raw combustible gas readily reaches and follows the threads used to fasten the valve to the tank outlet fitting so that there is a loss of gas as well as danger of combustion of the leaking gas, and even more dangerous is the fact that if the tank and valve combination are in a confined room or space this leakage may cause asphyxiation of the user or party breathing this gas-containing air. This has led to recommendations that the valve be disconnected from the tank if the assembly is to be laid aside and not used for a period of time. It was a recognition of these problems and difficulties which led to the conception and development of the present invention.

SUMMARY OF THE INVENTION

Accordingly, among the objects of the present invention is the provision of an improved valve assembly which substanitally eliminates gas leakage dangers and promotes free gas delivery by the valve to a point of use.

Another object is to provide a valve for use on liquefied gas tanks which substantially blocks leakage of gas through the valve body assembly to the point where it can escape through the connection of the valve to the tank, and thus avoids any need of removing the valve assembly and capping the tank between times of use.

Another object is to provide a valve for use on liquefied gas tanks for delivering the combustible material in gaseous form substantially free from droplets of liquefied gas even when the tank is inverted or lying on its side.

A further object is to provide a fine adjustment type of valve for liquefied gas tanks.

A further object is to provide an internal construction of a valve for use on "L.P." (liquefied propane) gas tanks which substantially avoids the passage of gas in liquid form through same.

Still further objects and advantages of the invention will appear as the description proceeds.

To the accomplishment of the foregoing and related ends the invention, then, consists of the valve features hereinafter fully described and particularly pointed out in the claims, the annexed drawing and the following description setting forth in detail certain illustrative embodiments of the invention, such disclosed embodiments illustrating, however, but one of the various ways in which the principle of the invention may be used.

BRIEF DESCRIPTION OF THE DRAWING

In the annexed drawing.

DESCRIPTION OF THE SPECIFIC EMBODIMENTS

Figures 1, 2:
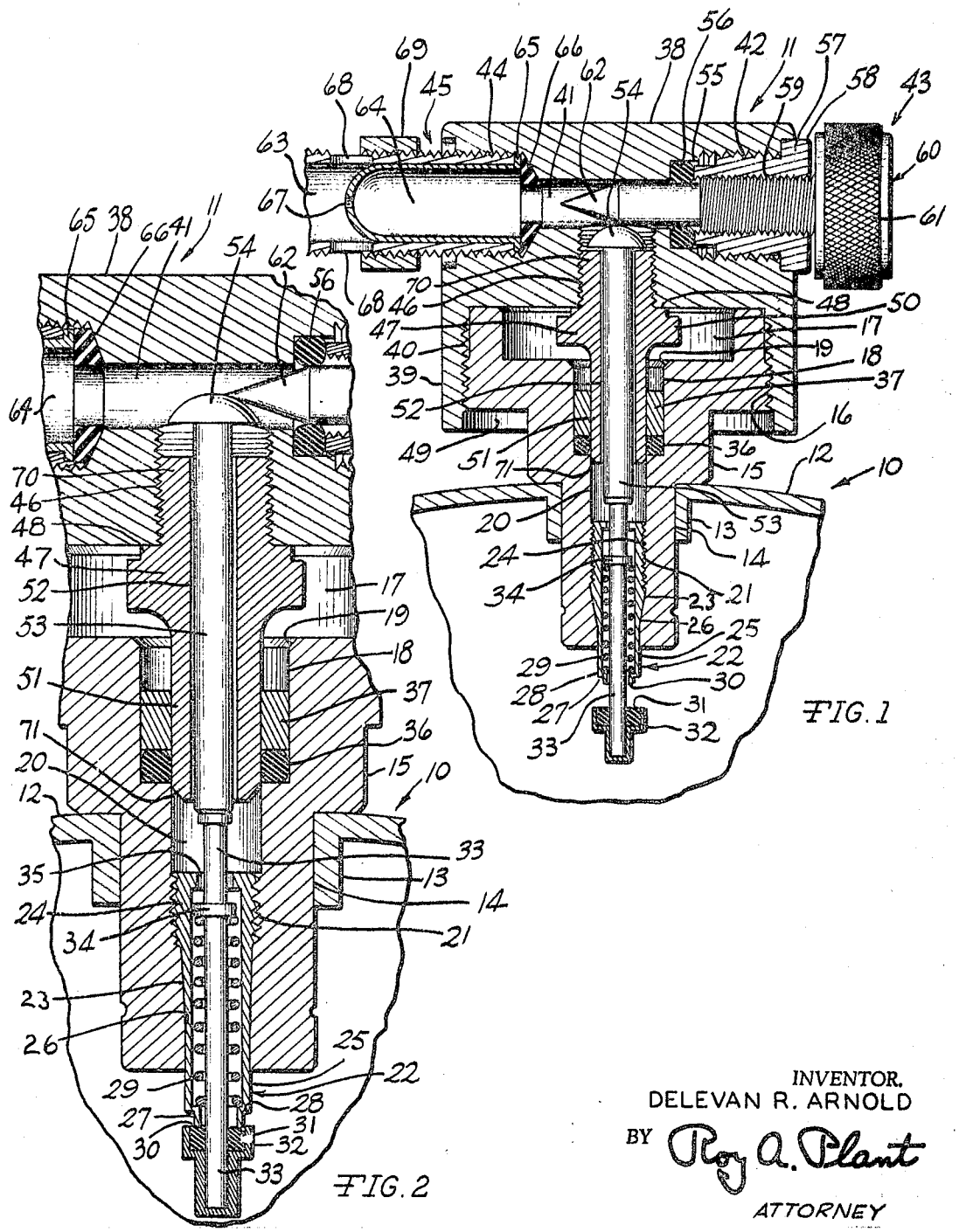
FIGURE 1 illustrates a preferred form of the valve of the present invention mounted on a fragmentary portion of a tank of liquefied gas, with the valve open.
FIGURE 2 illustrates an enlarged fragmentary center portion of the assembly shown in FIGURE 1 but with the valve closed.

First let us consider the commercially available tank assembly 10 on which the valve assembly 11 of the present invention is mounted and which cooperate with each other. The tank assembly comprises the tank 12 with its inturned flange 13 which provides an opening 14 into which connector 15 is tightly fitted and permanently anchored as by welding, soldering, brazing, or the like in gas-tight manner. This connector 15 is enlarged at its upper end and provided with external threads 16. This enlarged upper end of connector 15 is provided with an enlarged counterbore 17 utilizing a major portion of the top of connector 15 followed by a smaller counterbore 18 having a tapered inlet 19 between said counterbores. Adjacent and below counterbore 18 is a third counterbore 20 which is smaller than counterbore 18, and a lower portion of which is provided with internal threads 21 for engagement with a tank check valve assembly 22. Said counterbore 20 has an inward taper 23 below said internal threads 21, with said taper extending to the lower end of connector 15 inside of tank 12 to facilitate making a gas-tight connection.

Check valve assembly 22 has a body member 25 which is externally threaded on its upper end 24 and has a tapered portion 26 which tightly fits taper 23, said taper extending to said body 25 lower end 27 which is turned inward to form a shoulder 28 for supporting the lower end of a compression spring 29. Below shoulder 28, body member 25 extends further and has a smaller diameter square-cut end 30, which forms a seal on seating gasket 31, FIGURE 2, in the upper end of a cap 32 mounted fixedly by soldering or the like on the lower end of check valve stem 33 which is projected upwardly to seal end 30 on gasket 31 due to spring 29 bearing against collar 34 of valve stem 33 within body member 25 adjacent the top of the latter but inside of same. Valve stem 33 projects out of the top of body member 25 through passageway 35, FIGURE 2, for a purpose to be hereinafter described.

Fitting in the lower end of counterbore, FIGURE 2, is an O-ring 36 which forms a gasket for use as hereinafter described. This O-ring 36 is held firmly in place in conventional manner such as by means of a drive fit sleeve 37. Instead of holding sleeve 37 by drive fitting same, it could be threadedly held and it is intended that the showing be considered as diagrammatically illustrating such equivalent ways of supporting O-ring 36.

Now let us consider the construction of valve assembly 11 as shown in FIGURES 1 and 2. This valve assembly has a body member 38 with a lower flange 39 which is provided with internal threads 40 for use in tightly connecting valve body 38 to the threaded upper end of connector 15 on tank 12. Body member 38 is provided crosswise of its upper end with a crossbore 41, with one end of same counterbored and provided with internal threads 42 for connection to a valve control assembly 43. The other end of crossbore 41 is also counterbored and provided with internal threads 44 for connection to the gas outlet assembly 45 of the valve assembly 11.

Concentric with internal threads 40 at the lower end of valve body 38 is a threaded opening 46 which extends up into crossbore 41. Threadedly engaging said threaded opening 46 and concentric with said internal threads 40 is a guide sleeve member or probe 47 which has a shoulder 48 tightenable against the upper end of counterbore 49 by means of a tool engageable portion 50, preferably of hexagon shape, having said shoulder 48 on its upper end. Said upper end 70 of probe 47 falls short of reaching crossbore 41 to provide room for the upper end of actuating plunger 53, FIGURE 1. The lower sleeve portion 51 of guide sleeve member or probe 47 is of reduced size and co-axial with the internal threads of flange 39 and of an outside diameter to closely and tightly fit inside of sleeve 37 and seal on O-ring 36 so as to resist leakage through valve assembly 11. Guide sleeve member or probe 47 has a chamfered lower end 71 as well as a coaxial passageway 52 full length of same and in which is fitted a valve actuated pin or actuating plunger 53 which has a lower end for depressing check valve stem 33, and preferably a semi-spherical upper end 54 for a purpose to be explained. The stem of actuating plunger 53 is preferably about .003 inch to .005 inch smaller in diameter than passageway 52 through which the stem of plunger 53 extends, thus providing an annular passageway approximately .0025 inch in thickness. It has been found that with such size passageway gas flows properly and liquid propane becomes fully gasified before it passes through orifice 67, thus overcoming a problem inherent in the use of small tanks of "L.P." gas used on small appliances.

One end of crossbore 41 is provided with a counterbore 55 having internal threads 42 at the outer end of same and an O-ring gasket 56 at its inner end. Threadedly engaging said internal threads 42 is a gland 57, the outer end 58 of which preferably is hexagon shaped to facilitate tightening with a wrench (not shown). Coaxial of said gland 57, same is bored and provided with threads 59. A control valve member 60 having on its outer end an operating knob 61, preferably knurled for ease of operation, and a conical or rounded member or the equivalent 62 on its inner end adapted to contact the top of the semi-spherical upper end 54 of actuating plunger 53 so that with the valve assembly 11 closed as shown in FIGURE 2, rotation of control valve member 60 in appropriate direction to move same inward as shown in FIGURE 1, will cause the conical end 62 of valve member 60 to move over the semispherical upper end 54 of actuating plunger 53 and depress the latter to compress compression spring 29 and move gasket 31 away from seating on the square-cut end 30 of body member 25 so that the compressed combustible gas in tank 12 can flow up through the tank check valve assembly 22.

The valve assembly 11, at the outer or discharge end of crossbore 41, is counterbored and provided with internal threads 44 into which externally threaded outlet fitting 63 of outlet assembly 45 is tightenable. Inside of the end of outlet fitting 63 there is preferably provided a gas delivery chamber member 64, one end of which has an outturned flange 65 abutting the end of outlet fitting 63 with the other side of said flange 65 engaging a sealing gasket 66 to produce a leakproof joint. The opposite end of chamber member 64 is preferably protrudingly rounded and coaxially of same is a gas outlet orifice 67 for delivering the gas flowing through the valve assembly coaxially into outlet fitting 63.

At the opposite sides of said orifice 67, said outlet fitting 63 is provided with air inlets 68, and an internally threaded sleeve 69 which can be rotated on the external threads of outlet fitting 63 to axially shift said sleeve to variably cover openings 68 and thus control the air inflow due to the suction created by the flow of gas through orifice 67. This makes possible a proper air and combustible gas mixture for burning in a light, heater, or other mechanism adapted to utilize this gas. A typical apparatus adapted to utilize this gas valve is shown in my U.S. Design Patent No. 206,841, granted Jan. 31, 1967.

The use of my improved gas valve is as follows: Starting with a tank 12 of suitable compressed combustible gas, its sealing cap (not shown) is removed from connector 15, and valve assembly 11 screwed onto the upper end of connector 15, said valve assembly 11 has control valve member 60 with its end 62 retracted as shown in FIGURE 2 so that the tank check valve assembly 22 will remain closed as shown. The gas outlet assembly 45 is then tightened in place, and when gas flow is desired the valve control assembly 43 is actuated to force the conical end member 62 of same to the left as shown in FIGURE 1 thus cooperatively depressing actuating plunger 53 to open tank check valve assembly 22 and let the combustible gas flow out of tank 12 through the annular passageway 52 around actuating plunger 53 and thence through crossbore 41 to chamber member 64, its outlet orifice 67, and outlet fitting 63 to a point of use. Operating knob 61 of control valve 60 which is part of valve control assembly 43 will, of course, reduce and ultimately cut off the gas flow to outlet orifice 67 when rotated to move conical member 62 to the right as shown in the drawing.

It will thus be seen from the above that a relatively simple and easily manufactured valve assembly, which is both practical and durable, has been disclosed for attaining the desired ends. Attention is invited, however, to the possibility of making variations within the spirit and scope of the invention as set forth. Also directional terms such as "inturned," "external," "internal," "enlarged," "smaller," "below," "upwardly," "lower," "upper," and "outer," have been used to facilitate explaining the invention in the position shown in the drawing and are not to be considered as limiting the invention.

Other modes of applying the principle of my invention may be employed, instead of the one explained, change being made as regards the valve assembly combination herein disclosed, provided the means and/or features stated by any of the following claims or the equivalent of such stated means and/or features be employed.

I therefore particularly point out and distinctly claim as my invention:

1. A valve assembly of the character described for controlling the delivery of gas under pressure from a gas tank having a valve connector means projecting therefrom with said connector means having a check valve therein with a closure seat at its lower end within said tank, said check valve having a valve stem loosely passing through said closure seat and carrying a sealing gasket on its lower end with resilient means normally holding said sealing gasket sealed gas tight on said closure seat, which comprises a valve body member having a gas outlet passageway in its upper end and a flange means on its lower end for engaging said valve connector means of said gas tank, a probe extending coaxially of said body member flange means and in endwise alinement with said valve stem of said check valve but falling short of contracting same, means sealing said probe in said valve connector means in manner substantially eliminating gas leakage from said valve connector means around said probe and into said valve body member inside of said flange means, said probe having an axial longitudinal passageway full length of same and in axial alinement with said valve stem of said check valve, an actuating plunger loosely and slidably fitting said passageway in said probe with the lower end of said plunger operatively contacting the upper end of said valve stem of said check valve, and means in said body member for actuating said plunger in axial direction to operate said check valve in said valve connector means of said tank only when gas under pressure is to be withdrawn from said tank.

2. A valve assembly as set forth in claim 1, wherein said passageway through said probe is approximately .003 inch to .005 inch larger in diameter than that of said actuating plunger movable endwise in same, thus providing an annular passageway for the flow of gas from said tank through said probe in said valve body member and out of an orifice in said outlet passageway of said body member, and an air mixing valve adjacent said orifice.

3. A valve assembly as set forth in claim 1, wherein the upper end of said probe of said valve assembly threadedly engages said valve body member while the lower end of said probe is externally chamfered to facilitate passing same into said sealing means of said connector, said sealing means including a sealing gasket and means for holding same in place with the chamfered end of said probe passing therethrough; and wherein said valve body member gas outlet passageway has in the outlet end of same a gas delivery chamber member with a gas outlet orifice in its outer end, and means for anchoring the inner end of said gas delivery chamber member in gas tight manner to said valve body member.

4. A valve assembly as set forth in claim 3, wherein said passageway through said probe is approximately .003 inch to .005 inch larger in diameter than that of said actuating plunger movable endwise in same, thus providing an annular passageway for the flow of gas from said tank through said probe in said valve body member and out of an orifice in said outlet passageway of said body member.

5. A valve assembly as set forth in claim 1, wherein said means in said body member for actuating said plunger comprises a symmetrical upper end on said plunger which projects furthest at its axial center and from which end center it slopes downward, a rotatable means movable to and from said upper end of said plunger with which it cooperatively contacts to depress said plunger when rotated in one direction while allowing the depressed plunger to retract when moved in the other direction; and wherein said means for sealing said probe is in the form of an O-ring gasket with means for holding said gasket in place and firmly gripping said probe.

6. A valve assembly as set forth in claim 5, wherein said body member has a crossbore in its upper end and said rotatable means is threadedly mounted in one end of said crossbore of said body member with the gas outlet from said body member being at the other end of said crossbore, said rotatable means having an operating knob on its outer end with its other end inside of said body member being symmetrical and projecting furthest at the end of its axial centerline, said inner end sloping backward from said furthest projecting portion, the ends of said plunger and rotatable means, under operating conditions, being in contact with each other while said plunger is being moved endwise.

7. A valve assembly as set forth in claim 6, wherein the upper end of said plunger is of substantially semispherical shape, and the end of said rotatable member is substantially conical so that when said substantially conical end of said rotatable member is in contact with said substantially semispherical end of said plunger, rotation of said rotatable member through its substantially conical end in contact with said substantially semispherical end of said plunger will move the latter endwise, said plunger and rotatable member being substantially at right angles to each other.

8. In combination with a tank for liquefied gas with said tank having a connector extending into an end of same and sealed in gas-tight manner to same, said connector being axially bored full length of same and having an externally threaded top flange concentric with said longitudinal bore which in turn is counterbored and provided with an open center gasket and an annular means holding said gasket in place, the lower end of said counterbore being provided with internal threads followed by an inward taper substantially to the bottom of said connector, a check valve assembly fitting said threads and taper in substantially gas-tight manner and extending out through the bottom of said connector, said check valve assembly having a body portion carrying said threads and taper fitting those in said connector, said body member having a shoulder and a square-cut seating end below same, a check valve stem fitting inside of said body and freely movable lengthwise thereof, said valve stem having a collar on same inside of said body and spaced from the upper end of same, a compression spring fitting around said valve stem inside of said body and extending between said collar and said shoulder adjacent said square-cut end of said body member, said valve stem having mounted on the lower end of same a cap containing a gasket which will seal on the square-cut end of the body portion of said check valve under pressure exerted by said spring; a valve assembly having a valve body with an internally threaded flange extending from the bottom of same into engagement with the threaded upper end of said connector, said body having a coaxial threaded portion above said internally threaded flange, a probe having an externally threaded upper end portion threadedly engaging said threads in said body member, said probe having a longitudinal bore full length of same, the lower end of said probe passing through and tightly fitting the gasket in said connector member to form a seal substantially preventing leakage around said probe and into the space between said connector member and said valve body, an actuating plunger loosely and freely fitting said passageway through said probe with the lower end of said actuating plunger resting on the upper end of said check valve stem, the upper end of said actuating plunger having a semispherical head portion, said valve body having a crossbore in the upper portion of same substantially perpendicular to the passageway in said probe, one end of said crossbore being counterbored and internally threaded, an externally threaded gland fitting said threads in the end of said crossbore, a gasket at the inner end of said crossbore held tightly in place by means of said gland, said gland having an internally threaded axial bore therein, a control valve member having an operating knob on its outer end, an elongated portion extending from said operating knob of said control valve member with same externally threaded to fit the threads in said gland, the innermost end of said control valve member having a concentrically tapered portion adapted to contact the semispherical end of said actuating plunger for moving same downward and actuating said tank check valve when said operating knob is turned in a direction moving said point of same inwardly, the outlet end of said crossbore being counterbored and threaded, an outlet fitting having external threads in engagement with said threads in the end of said crossbore, a chamber member fitting inside of the end of said outlet fitting and having an outturned flange on its end nearest the tapered end of said control valve member, a sealing gasket in contact with the outer end face of said flange, said outlet fitting, when tightened, holding said flange in gas-tight manner against said gasket, said chamber member having an outlet orifice axially of its outer end, said outlet fitting being perforated opposite said outlet orifice for supplying air to said gas under the suction produced by said gas as it flows through said orifice, and an air inlet control sleeve threadedly fitting said outlet fitting and movable back and forth on said outlet fitting to vary the size of said air inlet openings and thus control the flow of air drawn into the outlet fitting thus permitting adjustment to form a proper burning mixture of gas and air.

9. A valve assembly as set forth in claim 8, wherein said passageway through said probe is approximately .003 inch to .005 inch larger in diameter than that of said actuating plunger movable endwise in same, thus providing an annular passageway for the flow of gas from said tank through said valve body member and out of said outlet passageway.

10. A valve assembly as set forth in claim 9, wherein the lower end of said probe is externally chamfered to facilitate passing same into said sealing means of said connector, said sealing means including a sealing gasket and means for holding same in place with the chamfered end of said probe passing therethrough.

11. A valve assembly as set forth in claim 10, wherein said passageway through said probe is approximately .003 inch to .005 inch larger in diameter than that of said actuating plunger movable endwise in same, thus providing an annular passageway for the flow of gas from said tank through said valve body member and out of said outlet passageway.

References Cited

UNITED STATES PATENTS

| | | | |
|---|---|---|---|
| 1,192,550 | 7/1916 | Needham | 138—46 X |
| 2,144,228 | 1/1939 | Penick et al. | 251—263 X |
| 2,536,231 | 1/1951 | Simanton | 251—321 X |
| 2,550,379 | 4/1951 | Rapisarda | 251—263 X |
| 2,793,504 | 5/1957 | Webster | 137—322 |
| 2,807,938 | 10/1957 | Skousgaard | 137—320 X |
| 2,888,979 | 6/1959 | Lindgren | 239—562 X |
| 2,971,742 | 2/1961 | Fausek et al. | 251—263 X |

WILLIAM F. O'DEA, Primary Examiner

DENNIS H. LAMBERT, Assistant Examiner

U.S. Cl. X.R.

137—605; 222—402.14; 239—562, 583; 251—322